(12) United States Patent
He et al.

(10) Patent No.: US 10,081,144 B2
(45) Date of Patent: Sep. 25, 2018

(54) LIGHT GUIDE PLATE AND FABRICATION METHOD THEREOF, EXTRUSION EQUIPMENT, BACKLIGHT MODULE AND DISPLAY DEVICE

(71) Applicants: BOE Technology Group Co., Ltd., Beijing (CN); Hefei BOE Display Lighting Co., Ltd., Anhui (CN)

(72) Inventors: Shuyong He, Beijing (CN); Yaling Kang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 151 days.

(21) Appl. No.: 15/137,295

(22) Filed: Apr. 25, 2016

(65) Prior Publication Data

US 2016/0282544 A1 Sep. 29, 2016

Related U.S. Application Data

(62) Division of application No. 14/072,938, filed on Nov. 6, 2013, now abandoned.

(30) Foreign Application Priority Data

Dec. 10, 2012 (CN) .......................... 2012 1 0530483

(51) Int. Cl.
*B29D 11/00* (2006.01)
*F21V 8/00* (2006.01)
(Continued)

(52) U.S. Cl.
CPC .... *B29D 11/00663* (2013.01); *B29C 47/0057* (2013.01); *B29C 47/0066* (2013.01);
(Continued)

(58) Field of Classification Search
CPC .. G02B 6/0063; G02B 6/0065; G02B 6/0035; G02B 6/0041; B29D 11/00663; B29C 47/92; B29C 47/0057; B29C 47/0066
See application file for complete search history.

(56) References Cited

U.S. PATENT DOCUMENTS 5,269,977 A 12/1993 Nakahashi et al.
6,937,399 B2 8/2005 Takahashi
(Continued)

FOREIGN PATENT DOCUMENTS

CN 102093676 A 6/2011
CN 102121668 A 7/2011
(Continued)

OTHER PUBLICATIONS

First office action and search issued by Chinese Patent Office for priority application 201210530483.7 dated Nov. 28, 2011.
(Continued)

*Primary Examiner* — Mathieu Vargot
(74) *Attorney, Agent, or Firm* — Haug Partners LLP

(57) ABSTRACT

The present invention relates to a light guide plate (LGP) capable of bidirectional focusing via a bidirectional micro-transmissive layer, a fabrication method of the LGP, an extrusion equipment, a backlight module and a display device. The LGP comprises a LGP substrate, the LGP substrate comprises at least one incident surface for receiving a light beam and one outgoing surface connected to the incident surface, a bidirectional micro-transmissive layer is provided in the LGP substrate, the bidirectional micro-transmissive layer comprises a plurality of micro-transmissive points having biconvex surfaces. According to the principle that convex lens converges light, the design of micro-transmissive points having biconvex surfaces causes several scattered light beams having different directions that enter the micro-transmissive points to be converged, which
(Continued)

effectively improves the brightness of the outgoing surface of the LGP, thereby improving the brightness and definition of images displayed in the liquid crystal panel.

6 Claims, 5 Drawing Sheets

(51) Int. Cl.
*B29C 47/92* (2006.01)
*B29C 47/00* (2006.01)
*B29K 101/12* (2006.01)

(52) U.S. Cl.
CPC ............ *B29C 47/92* (2013.01); *G02B 6/0035* (2013.01); *G02B 6/0041* (2013.01); *G02B 6/0063* (2013.01); *G02B 6/0065* (2013.01); *B29C 2947/92019* (2013.01); *B29C 2947/9279* (2013.01); *B29C 2947/92209* (2013.01); *B29C 2947/92428* (2013.01); *B29C 2947/92514* (2013.01); *B29C 2947/92704* (2013.01); *B29C 2947/92809* (2013.01); *B29C 2947/92904* (2013.01); *B29C 2947/92923* (2013.01); *B29K 2101/12* (2013.01)

(56) References Cited

U.S. PATENT DOCUMENTS

| 8,899,815 | B2 | 12/2014 | Chen | |
|---|---|---|---|---|
| 2006/0120110 | A1 | 6/2006 | Lin et al. | |
| 2008/0026200 | A1* | 1/2008 | Kim | ................ B29C 33/42 |
| | | | | 428/304.4 |
| 2010/0213632 | A1* | 8/2010 | Katsumoto | ......... B29C 47/0066 |
| | | | | 264/167 |

FOREIGN PATENT DOCUMENTS

| CN | 102298169 A | 12/2011 |
|---|---|---|
| CN | 102582087 A | 7/2012 |
| JP | 55-67317 | * 5/1980 |
| WO | WO 2006/054509 A | 5/2006 |

OTHER PUBLICATIONS

Second office action issued by Chinese Patent Office for priority application 201210530483.7 dated Aug. 5, 2014.

* cited by examiner

LIGHT GUIDE PLATE AND FABRICATION METHOD THEREOF, EXTRUSION EQUIPMENT, BACKLIGHT MODULE AND DISPLAY DEVICE

CROSS-REFERENCE TO RELATED APPLICATIONS

This application is a division of U.S. patent application Ser. No. 14/072,938 filed Nov. 6, 2013, the entire contents of which are incorporated herein by reference, which claims the benefit of priority under 35 U.S.C. § 119 of Chinese Patent Application Number 201210530483.7 filed Dec. 10, 2012.

FIELD OF THE INVENTION

The present invention relates to the field of display technology, more particularly, to a light guide plate (LGP) and fabrication method thereof capable of bidirectionally focusing via a bidirectional micro-transmissive layer, an extrusion equipment, a backlight module and a display device.

BACKGROUND OF THE INVENTION

As liquid crystal molecules do not emit light themselves, external light sources are required to display image in conventional liquid crystal display (LCD) devices. Backlight modules are classified into direct type backlight module and side type backlight module based on the arrangement location of the light source. In a side type backlight module, light source is arranged at a side of an LGP, and the light emitted from the light source (such as a lamp bar) irradiates directly into the LGP which will convert parallel incident light from the side into surface light. In a direct type backlight module, light source is arranged below the liquid crystal panel; the light emitted from the light source travels through a certain spatial distance and is diffused and mixed by the diffuser plate to be emitted as a surface light source.

In the side type backlight module, light source is arranged at at least one side of the LOP, which will render the light on the outgoing surface of the LGP unevenly-distributed. Specifically, a position closer to the light source has a brighter light while a position farther from the light source has a dimmer light. To solve the problem of uneven light on the outgoing surface of the LGP, one solution used in prior art is that grid points are provided on the bottom side of the LGP and total internally reflected light in the LGP is scattered via diffuse reflection by the grip points to adjust the uniformity of the light. The LGP with the grid points can solve the problem of uneven light on the outgoing surface of the LGP to a certain extent, but the adjustment of luminance with such LGP is not adequate. Moreover, the scattered light is over-dispersed and cannot be converged, which leads to low display brightness of the LGP and further causes unclear image on the liquid crystal panel. In consideration of the above disadvantages, the present invention provides a new LGP and a fabrication method of the LGP.

SUMMARY OF THE INVENTION

An objective of the present invention is to provide a LGP and a fabrication method thereof, an extrusion equipment, a backlight module and a display device, and the LGP can focus light bidirectionally through a bidirectional micro-transmissive layer.

To achieve the above objective, a first aspect of the invention provides a LGP comprising a LGP substrate, the LGP substrate comprises at least one incident surface for receiving light beam and one outgoing surface connected to the at least one incident surface, a bidirectional micro-transmissive layer is provided in the LGP substrate, the bidirectional micro-transmissive layer includes a plurality of micro-transmissive points having biconvex surfaces.

Preferably, the bidirectional micro-transmissive layer is an array bidirectional micro-transmissive layer.

Preferably, the micro-transmissive points are hollow spheres or quasi-spheres.

Preferably, the LGP is made from any one or combination of the followings: polyethylene terephthalate, polycarbonate, polymethylmethacrylate, polyether ether ketone, polyethylene naphthalate, polyethylene succinate), and polypropylene oxidant.

A second aspect of the present invention provides a fabrication method of any of the above LGP, the method includes the following steps:

S1: loading light guide material into a heating device;

S2: heating the light guide material into molten state by the heating device;

S3: extruding the molten light guide material into molten light guide raw plate by an extrusion equipment;

S4: injecting bubbles into the molten light guide raw plate by controlling a bubbler during the process of extruding the molten light guide material into the molten light guide raw plate; and S5: shaping to form the light guide plate after extruding the molten light guide raw plate out of a mould mouth.

The step S4 includes the following steps:

S41: presetting a distribution pattern of the micro-transmissive points in an automatic control circuit; and S42: automatically controlling the bubbler to release bubbles according to the distribution pattern of the micro-transmissive points by the automatic control circuit.

The step S42 includes the following steps:

S421: adjusting sizes of the bubbles through controlling pressure of a pressure holder for injecting gas by the automatic control circuit;

S422: adjusting arrangement density of the bubbles through controlling rotation velocity of a rotating barrel by the automatic control circuit.

The step S5 further includes:

S51: forming plastic light guide raw plate after cooling the molten light guide raw plate with circulating water through a cooling device connected to the mould mouth;

S52: rolling the plastic light guide raw plate into plastic light guide sheet by a rolling device;

S53; leading out the plastic light guide sheet by a conveying device and forming light guide sheet after air cooling the plastic light guide sheet during the leading-out process;

S54: cutting the light guide sheet into LGPs by a cutting device.

A third aspect of the invention provides an extrusion equipment for implementing any of the above fabrication methods of the LGP, the extrusion equipment includes: a heating device for heating the light guide material, an extrusion device for extruding the molten light guide material, a bubbler for arranging the bubble layer in the molten light guide raw plate, a cooling device for cooling the molten light guide raw plate to the plastic light guide raw plate, a rolling device for rolling the plastic light guide raw plate to the plastic light guide sheet, a conveying device for leading out the plastic light guide sheet, and a cutting device for cutting the air cooled light guide sheet into the LGPs according to specification.

The bubbler is provided inside the mould mouth of the extrusion equipment.

The bubbler has an outer barrel, a rotating barrel is provided in the outer barrel, the rotating barrel is fitted in the outer barrel 116 with its rotation shaft 117 passing perpendicularly through both end sides of the outer barrel 116; multiple columns of venting holes are uniformly arranged on the wall of the rotating barrel, and a single column of venting holes corresponding to the positions of the multiple columns of venting holes is provided on the outer barrel.

A pressure holder is provided in the rotating barrel; the pressure holder includes a pump that continuously injects gas into the rotating barrel.

A drive motor for driving the rotating barrel is provided on the rotation shaft and an electric valve is connected to the pressure holder; both the motor and the electric valve are connected to the automatic control circuit through wires.

The bubbler is horizontally erected inside the mould mouth, and the bubble releasing direction of the single column of venting holes of the bubbler is the same as the outfeed direction of the mould mouth.

A fourth aspect of the invention provides a backlight module includes any of the above LGPs.

A fifth aspect of the invention provides a display device including the above backlight module.

In comparison with prior art, the present invention has the following advantages:

1. The present invention uses a bidirectional micro-transmissive layer formed of a plurality of micro-transmissive points, with which directions of all scattered light beams in the LGP can be adjusted and the scattered light beams can be focuses, thereby improving the brightness and definition of images displayed in the liquid crystal panel as well as the product quality. According to the principle that convex lens converges light, the biconvex surfaces of the micro-transmissive points cause several scattered light beams having different directions that enter into the micro-transmissive points to be converged, which effectively improves the brightness of the outgoing surface of the LGP, thereby improving the brightness and definition of images displayed in the liquid crystal panel as well as the product quality. Moreover, the biconvex surfaces can also facilitate bidirectional use of the LGP, that is, the incident and outgoing surfaces of the LGP can be exchanged, such that both surfaces can emit light.

2. The present invention uses a bubbler to inject bubblers into the molten light guide raw plate, and thus forming the bidirectional micro-transmissive layer. The bubble layer formed in the molten light guide raw plate conforms to the design requirement of the distribution pattern of the micro-transmissive points. After the molten light guide raw plate is made into the LGPs, the bubble layer is the bidirectional micro-transmissive layer of the LGP and the individual bubbles are the individual micro-transmissive points of the bidirectional micro-transmissive layer. The bubbler is of simple structure, low cost, and easy operation; moreover, the micro-transmissive points in the achieved micro-transmissive layer have good transmittivity and are evenly distributed, which effectively improves the production efficiency and simplifies the fabrication process.

BRIEF DESCRIPTION OF THE DRAWINGS

The present invention will be further described in connection with the drawings and the embodiments below.

DETAILED DESCRIPTION OF EMBODIMENTS

Figure 1:
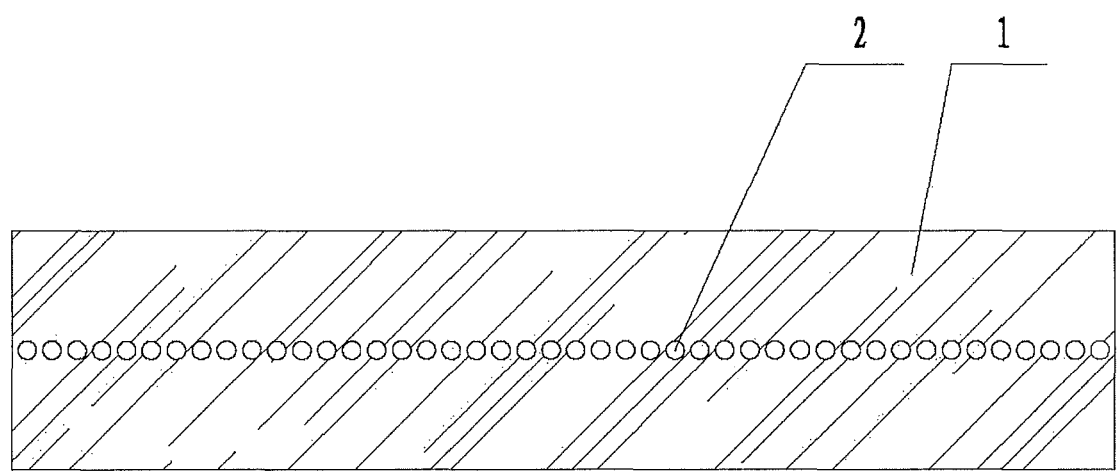
FIG. 1 is a schematic diagram of a structure (a cross section) of an LGP of the present invention.

With reference to FIG. 1, an LGP according to an embodiment of the present invention includes a LGP substrate 1, the LGP substrate 1 includes an incident surface for receiving light beams, a bottom surface connected to the incident surface, an outgoing surface connected to the incident surface and opposite to the bottom surface, a side surface opposite to the incident surface and two remaining side surfaces opposite to each other. A bidirectional micro-transmissive layer is provided in the LGP substrate 1, and includes a plurality of micro-transmissive points 2 including biconvex surfaces. The biconvex surfaces of a micro-transmissive point 2 have two convex surfaces which correspond to the incident surface and the outgoing surface of the LGP substrate, respectively. The convex surfaces are arced mirror surfaces capable of focusing light. Preferably, the biconvex micro-transmissive points are hollow spheres or quasi-spheres such as ellipsoid. During practical production, the hollow spheres or quasi-spheres are easily formed by means of blowing bubbles. The present invention uses a bidirectional micro-transmissive layer with which directions of all scattered light beams in the LGP are adjusted and the scattered light beams are focused, thereby improving the brightness and definition of images displayed in the liquid crystal panel as well as the product quality. According to the principle that convex lens converges light, the design of micro-transmissive points having biconvex surfaces causes several scattered light beams having different directions that enter into the micro-transmissive points to be converged, which effectively improves the brightness of the outgoing surface of the LGP, thereby improving the brightness and definition of images displayed in the liquid crystal panel as well as the product quality. Moreover, the biconvex surfaces can also facilitate bidirectional use of the LGP, that is, the incident and outgoing surfaces of the LGP can be exchanged, such that both surfaces can emit light. Preferably, in this embodiment, height of a micro-transmissive point is between 0.003 mm and 0.4 mm, spacing between micro-transmissive points is between 0.02 mm and 0.2 mm, and the bidirectional micro-transmissive layer is an array bidirectional micro-transmissive layer.

The LGP of the embodiment is made from a plastic material such as polyethylene terephthalate, polycarbonate, polymethylmethacrylate, polyether ether ketone, polyethylene naphthalate, polyethylene succinate), and/or polypropylene oxidant.

Figure 5:
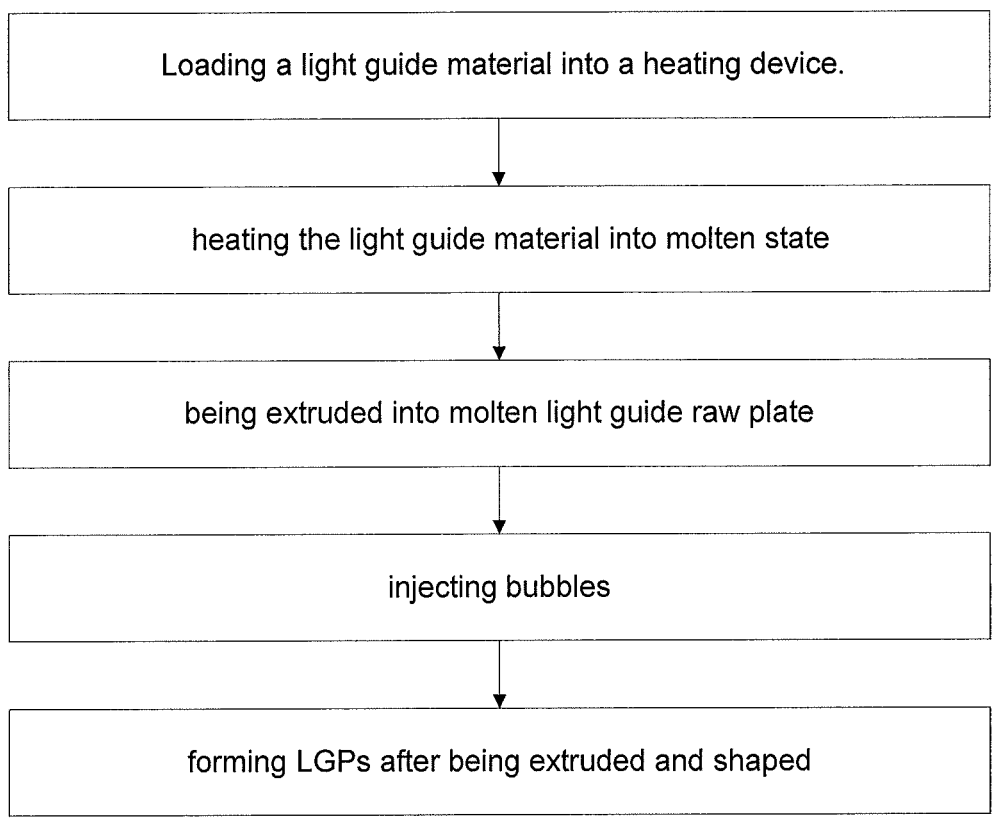
FIG. 5 is a flow chart of a fabrication method of the LGP of the present invention.

With reference to FIG. 5, a fabrication method of the LGP according to the present invention includes the following steps:

1. Load the light guide material into a heating device.

Figure 2:
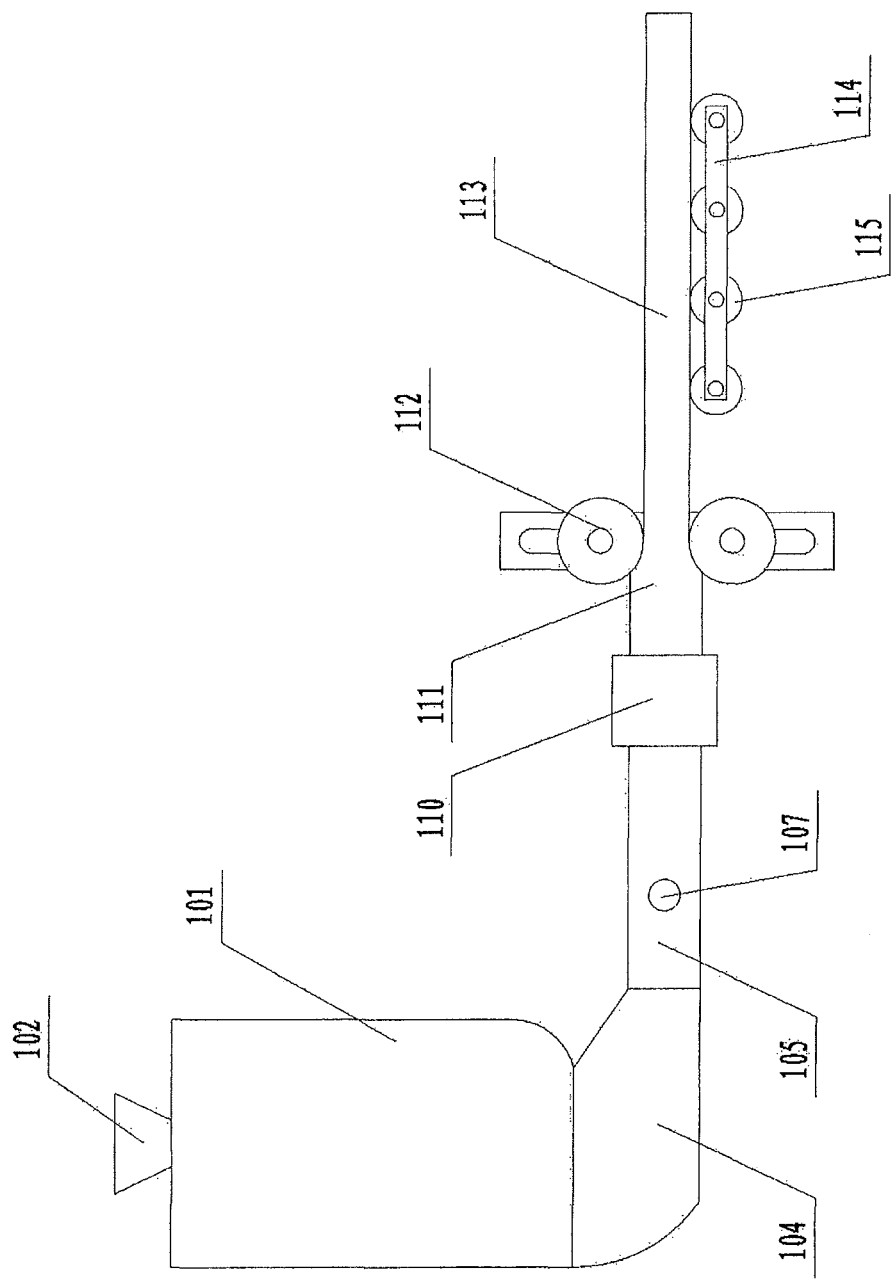
FIG. 2 is a schematic diagram of a structure (a top view) of an extrusion equipment of the present invention.

As illustrated in FIG. 2, the heating device may include a heating furnace 101 and a hopper 102 disposed on a feed-throat of the heating furnace 101. The light guide material is fed into the heating furnace 101 through the tapered hopper 102 and then heated sufficiently by the heating furnace 101. The heating device of the present invention may be any conventional heating device capable of heating the light guide material, which will not be elaborated here.

2. The heating device heats the light guide material into molten state, which means solid particles of the light guide material is melt into liquid state under a high temperature such as 240° C.

3. An extrusion equipment extrudes the molten light guide material into molten light guide raw plate 103; preferable, the extrusion pressure of the extrusion equipment ranges from 50 pa to 100 pa.

The extrusion equipment of the present invention may be the equipment shown in FIG. 2, which includes a screw feeding device 104 and a mould mouth 105 connected to the output terminal of the screw feeding device 104. The extrusion equipment is arranged at the bottom end of the heating furnace 101 of the heating device and connected to an outlet of the heating furnace 101. Specifically, the screw feeding device 104 of the extrusion equipment is connected to the outlet of the heating furnace 101. The extrusion equipment of the present invention may be any conventional extrusion equipment capable of extruding the molten light guide material into the molten light guide raw plate and will not be elaborated here.

4. During the process of extruding the molten light guide material into the molten light guide raw plate, a bubbler 107 is controlled to inject bubbles 106 into the molten light guide raw plate.

Specifically, a distribution pattern of the micro-transmissive points is preset in an automatic control circuit, which controls the bubbler 107 to release bubbles according to the distribution pattern of the micro-transmissive points. The automatic control circuit may adjust the size of the bubbles by controlling pressure for injecting gases of a pressure holder 108 in the bubbler 107. The automatic control circuit may also adjust arrangement density of the bubbles by controlling rotation velocity of a rotating barrel 109 of the bubbler 107. Therefore, the micro-transmissive points may have different sizes and/or arrangement density.

Through the above steps, the automatic control circuit can automatically arrange bubbles in accordance with the preset distribution pattern of the micro-transmissive points, such that the bubble layer formed in the molten light guide raw plate can meet the requirement of the distribution pattern of micro-transmissive points. After the molten light guide raw plate is made into LGPs, the bubble layer is the bidirectional micro-transmissive layer in the LGP, and individual bubbles are individual micro-transmissive points of the bidirectional micro-transmissive layer.

Figure 4:
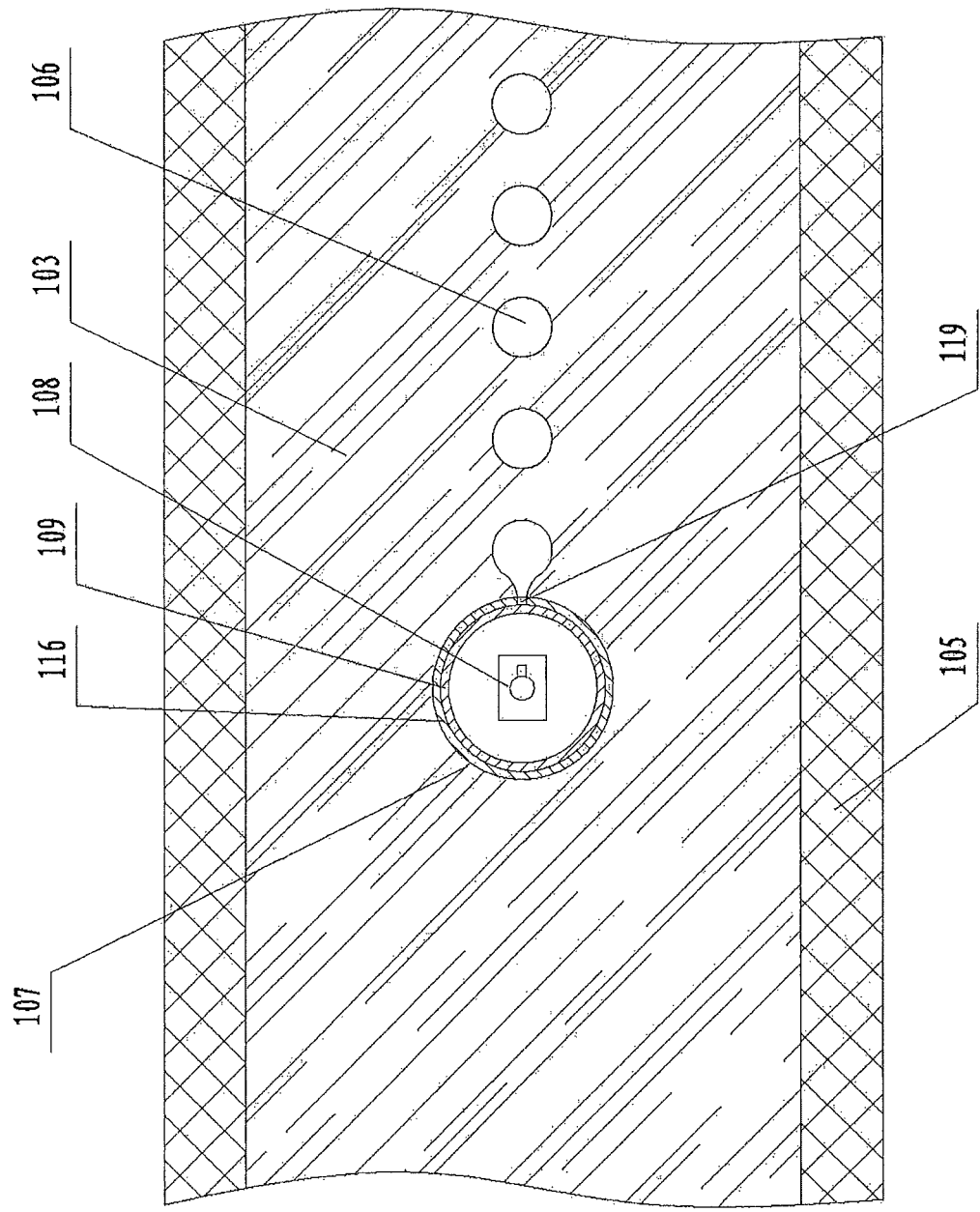
FIG. 4 is a schematic diagram of a structure (a partial cross section) of a mould mouth of the present invention.

As illustrated in FIG. 4, the bubbler 107 of the present invention is erected inside the mould mouth 105 of the extrusion equipment and is positioned at the vertical center of the mould mouth 105. Bubble releasing direction of the bubbler 107 is the same as the outfeed direction of the mould mouth 105. When the extrusion equipment extrudes the molten light guide material to the bubbler 107, the bubbler 107 automatically separates the molten light guide material into an upper layer and a lower layer under the extrusion pressure; at this point, the bubbler 107 starts to release bubbles. When the upper and lower layers of molten light guide material pass by the bubbler 107, they automatically unite as one layer under the gravity, such that the bubbles are automatically sandwiched inside the molten light guide material and then form the bidirectional micro-transmissive layer.

5. The molten light guide raw plate extruded from the mould mouth 105 forms the LGP after being shaped. Specifically, the extruded molten light guide raw plate is cooled with circulating water by passing through a water cooling device 110 connected to the mould mouth 105 and then forms the plastic light guide raw plate. The plastic light guide raw plate is rolled by a rolling device to form a plastic light guide sheet, which is then led out by a conveying device. Finally, the light guide sheet is cut into the LGPs by a cutting device.

As illustrated in FIG. 2, the water cooling device 110 is arranged corresponding to the mould mouth 105 of the extrusion equipment. Specifically, the water cooling device 110 is positioned near the outlet of the mould mouth 105, and the distance between the water cooling device 110 and the bubbler 107 is far enough such that the molten light guide material separated by the bubbler 107 into the upper and lower layers have already reunite when reaching the water cooling device 110. The automatic control circuit controls the temperature and velocity of flow of the water cooling device 110 to half cool the molten light guide raw plate, and the molten light guide raw plate is thus cooled into solid-liquid state, thereby forming the plastic light guide raw plate 111. The water cooling device of the present invention may be any water cooling device capable of cooling the molten light guide raw plate and will not be elaborated here.

The rolling device of the present invention may be the rolling device shown in FIG. 2, it includes a set of rolls 112 arranged corresponding to each other, distance between the two rolls 112 is adjustable, and the set of rolls 112 is driven by an external motor. The plastic light guide raw plate is rolled to form the plastic light guide sheet 113. The automatic control circuit adjusts the shape of the rolled plastic light guide sheet by controlling the distance between the two rolls 112 and the rotation velocity of the rolls 112. The rolling device of the invention may be any conventional rolling device capable of rolling the plastic light guide sheet and will not be elaborated here.

The conveying device of the present invention may be the conveying device shown in FIG. 2, it includes a conveying platform 114 and a plurality of juxtaposed rollers 115 erected on the conveying platform. The plurality of rollers 115 is driven by an external motor to lead out the plastic light guide sheet. During the leading out process, the plastic light guide sheet is cooled in room temperature (between 20° C.-30° C.) to form the light guide sheet. The automatic control circuit controls the cooling time by controlling the rotation velocity of the rollers. The light guide sheet is conveyed by the conveying device to the cutting device. The conveying device of the present invention may be any conventional conveying device capable of conveying the light guide sheet and will not be elaborated here.

The cutting device of the present invention (not shown in the figures) may include a clamping and conveying device and a blade set. The light guide sheet is clamped and conveyed to the blade set by a set of clamping and conveying wheels of the clamping and conveying device to be cut into light guide plates meeting production requirements by the blade set. The clamping and conveying device is driven by an external motor, and the blade set is connected to the automatic control circuit via an electric valve. The automatic control circuit controls the size of the cut LGPs by controlling the conveying speed of the clamping and conveying device and the cut frequency of the blade set. The cutting device of the present invention may be any conventional cutting device capable of cutting the light guide sheet and will not be elaborated here.

Figure 3:
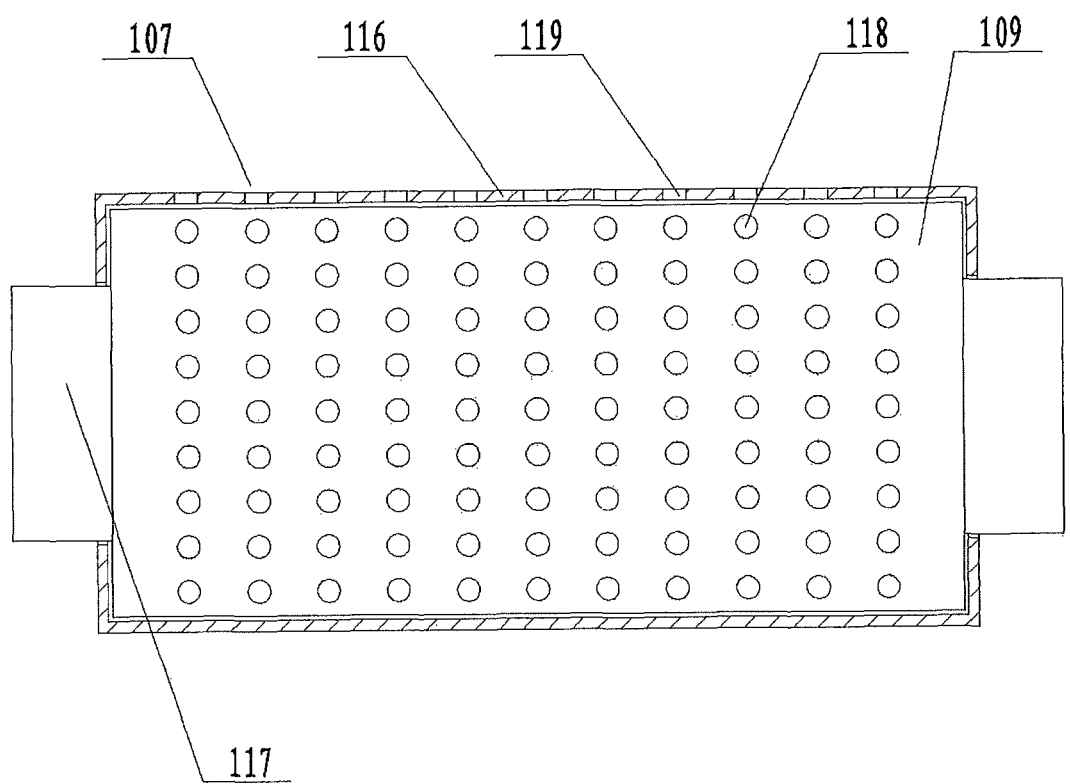
FIG. 3 is a schematic diagram of a structure (a cross section) of a bubbler of the present invention.

To implement the fabrication method of the LGP, the present invention provides an extrusion equipment, which is improved based on conventional extrusion machines. With reference to FIG. 2, the extrusion equipment includes the following parts: a heating device for heating the light guide material, an extrusion device for extruding the molten light guide material, a bubbler 107 for arranging the bubble layer in the molten light guide material, a cooling device 110 for cooling the molten light guide raw plate to plastic light guide raw plate, a rolling device for rolling the plastic light guide raw plate into plastic light guide sheet, a conveying device for leading out the plastic light guide sheet, a cutting device for cutting the air cooled light guide sheet into LGPs according to the specification and an automatic control circuit (not shown) for centrally controlling each of the afore-mentioned devices. The plastic light guide sheet is air naturally cooled to form the light guide sheet when being conveyed by the conveying device. With reference to FIGS. 3 and 4, the bubbler 107 of the extrusion equipment is provided inside the mould mouth 105 of the extrusion equipment. The bubbler 107 has an outer barrel 116 and a rotating barrel is provided in the outer barrel 116, the rotating barrel is fitted in the outer barrel 116 with its rotation shaft 117 passing perpendicularly through both end sides of the outer barrel 116. Multiple columns of venting holes 118 are uniformly disposed on the wall of the rotating barrel, and a single column of venting holes 119 corresponding to the positions of the multiple columns of venting holes 118 is provided on the outer barrel 116. When one column of venting holes 118 is aligned with the single column of venting holes 119 during rotation of the rotating barrel, the bubbles released from the venting holes 118 are released from the bubbler 107 through the single column of venting holes 119, and form a column of bubbles in the molten light guide raw plate. This bubble releasing process may be repeated many times by rotating the rotating barrel, thus forming the bubble layer in the molten light guide raw plate which is the bidirectional micro-transmissive layer in the final LGP. A pressure-holder 108 is provided in the rotating barrel of the bubbler 107; the pressure-holder 108 includes a pump that continuously injects gas into the rotating barrel to ensure that the bubbler 107 has sufficient gas and pressure for releasing bubbles. Preferably, the gas is a dried non-corrosive gas such as $CO_2$, $N_2$ and the like. A drive motor for driving the rotating barrel is arranged on the rotation shaft and an electric valve is connected to the pressure holder 108. The motor and the electric valve are both connected to the automatic control circuit through wires, thereby realizing automatic control of the bubbler 107 by the automatic control circuit. The bubbler 107 is horizontally erected inside the mould mouth 105 and the bubble releasing direction of the single column of bubbles by the bubbler 107 is the same as the outfeed direction of the mould mouth 105. The whole bubbler 107 of the present invention is made of a high temperature refractory material.

The light guide material of the present invention uses a plastic material having good transmittivity, such as polyethylene terephthalate, polycarbonate, polymethylmethacrylate, polyether ether ketone, polyethylene naphthalate, poly (ethylene succinate), and/or polypropylene oxidant.

Furthermore, an embodiment of the present invention provides a backlight module including the afore-described LGP or an LGP made by the above fabrication method.

The backlight module of the present invention may be applied to display devices which may be any product or component having a display function, such as an LCD panel, an E-paper, an OLED panel, a liquid crystal television, an LCD monitor, a digital photo-frame, a mobile phone or a tablet PC.

The invention claimed is:

1. A fabrication method of a light guide plate, wherein the light guide plate comprising a light guide plate (LGP) substrate, the LGP substrate comprises at least one incident surface for receiving a light beam and one outgoing surface connected to the at least one incident surface, wherein a bidirectional micro-transmissive layer is provided in the LGP substrate, the bidirectional micro-transmissive layer comprises a plurality of micro-transmissive points having biconvex surfaces, the fabrication method comprises the following steps:
   S1: loading light guide material into a heating device;
   S2: heating the light guide material into molten state by the heating device;
   S3: extruding the molten light guide material into molten light guide raw plate by an extrusion equipment;
   S4: injecting bubbles into the molten light guide raw plate by controlling a bubbler during the process of extruding the molten light guide material into the molten light guide raw plate by the extrusion equipment, wherein the extrusion equipment extrudes the molten light guide material to the bubbler and the bubbler separates the molten light guide material into an upper layer and a lower layer and starts to inject said bubbles at this point; and
   S5: shaping to form the light guide plate after extruding the molten light guide raw plate out of a mould mouth.

2. The method of claim 1, wherein step S4 comprises the following steps:
   S41: presetting a distribution pattern of the micro-transmissive points in an automatic control circuit; and
   S42: automatically controlling the bubbler to release bubble in accordance with the distribution pattern of the micro-transmissive points by the automatic control circuit.

3. The method of claim 2, wherein step S42 comprises the following steps:
   S421: adjusting sizes of the bubbles through controlling pressure of a pressure holder for injecting gas by the automatic control circuit;
   S422: adjusting arrangement density of the bubbles through controlling rotation velocity of a rotating barrel by the automatic control circuit.

4. The method of claim 1, wherein step S5 further comprises:
   S51: forming plastic light guide raw plate after cooling the molten light guide raw plate with circulating water through a cooling device connected to the mould mouth;
   S52: rolling the plastic light guide raw plate into plastic light guide sheet by a rolling device;
   S53: leading out the plastic light guide sheet by a conveying device and forming light guide sheet after air cooling the plastic light guide sheet during the leading-out process;
   S54: cutting the light guide sheet into the LGPs by a cutting device.

5. The method of claim 2, wherein step S5 further comprises:
   S51: forming plastic light guide raw plate after cooling the molten light guide raw plate with circulating water through a cooling device connected to the mould mouth;

S52: rolling the plastic light guide raw plate into plastic light guide sheet by a rolling device;

S53: leading out the plastic light guide sheet by a conveying device and forming light guide sheet after air cooling the plastic light guide sheet during the leading-out process;

S54: cutting the light guide sheet into the LGPs by a cutting device.

6. The method of claim 3, wherein step S5 further comprises:

S51: forming plastic light guide raw plate after cooling the molten light guide raw plate with circulating water through a cooling device connected to the mould mouth;

S52: rolling the plastic light guide raw plate into plastic light guide sheet by a rolling device;

S53: leading out the plastic light guide sheet by a conveying device and forming light guide sheet after air cooling the plastic light guide sheet during the leading-out process;

S54: cutting the light guide sheet into the LGPs by a cutting device.

\* \* \* \* \*